United States Patent [19]

Myers et al.

[11] Patent Number: 5,601,639
[45] Date of Patent: Feb. 11, 1997

[54] SYSTEM AND METHOD FOR ACHIEVING RUNNABILITY AND JET STRAIGHTNESS FOR A DIGITAL COLOR PRESS

[75] Inventors: Shiow-Meei L. Myers; Hilarion Braun; Larry G. Calhoun; Bipin G. Bhatt; Eric J. Stevenson, all of Dayton, Ohio

[73] Assignee: Scitex Digital Printing, Inc., Dayton, Ohio

[21] Appl. No.: 434,601

[22] Filed: May 4, 1995

[51] Int. Cl.⁶ .................................................. C09D 11/02
[52] U.S. Cl. ................. 106/22 R; 106/20 D; 106/22 K; 106/22 D
[58] Field of Search ................. 106/22 R, 20 D, 106/22 K, 22 D

[56] References Cited

U.S. PATENT DOCUMENTS

| | | | |
|---|---|---|---|
| 4,585,484 | 4/1986 | Haruta et al. | 106/22 B |
| 4,627,875 | 12/1986 | Kobayashi et al. | 106/22 H |
| 4,957,553 | 9/1990 | Koike et al. | 106/22 H |
| 5,183,502 | 2/1993 | Meichsner et al. | 106/20 D |
| 5,196,056 | 3/1993 | Prasad | 106/20 D |
| 5,397,386 | 3/1995 | Nakazawa et al. | 106/22 K |
| 5,415,686 | 5/1995 | Kurabayashi et al. | 106/20 C |

*Primary Examiner*—Helene Klemanski
*Attorney, Agent, or Firm*—Barbara Joan Haushalter

[57] ABSTRACT

An ink jet ink composition comprises a liquid vehicle, a single dye component, a surfactant and a glycol. The dye is water soluble and selected from the group consisting of Direct Dyes, Acid Dyes and Food Dyes, and preferably from the group consisting of Direct Yellow 86, Acid Red 249, Acid Red 92 and Direct Blue 199. Concentration of the dye is preferably in the range of 1% to 2% by weight. Using the ink composition of the present invention, images are generated by a continuous stream digital color press ink jet printing apparatus. In a preferred embodiment, to optimize runnability and jet straightness, the digital color press employs a gold orifice plate having an orifice diameter in the range of 0.7 to 0.8 mil.

10 Claims, No Drawings

SYSTEM AND METHOD FOR ACHIEVING RUNNABILITY AND JET STRAIGHTNESS FOR A DIGITAL COLOR PRESS

TECHNICAL FIELD

The present invention relates to ink jet printing and, more particularly, to formulation of primary color inks to achieve good runnability in a digital color press, with improved jet straightness.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

Full color graphics printing with such continuous ink jet systems is being developed and practiced by Scitex Digital Printing, Inc., in Dayton, Ohio. One challenge with developing a digital color press is to formulate inks which will run in the digital color press. Existing ink formulations are two-dye inks. Such previous inks which were formulated for 120 and 240 dots per inch (dpi) systems were tried in the digital color press, but unfortunately exhibited severe raggedness after a very short time. Furthermore, the prints produced were poor quality and unacceptable.

One major difference between the digital color press and previous systems is the orifice diameter, which is significantly smaller in the DCP as compared to other systems (e.g., 0.7 mil in the DCP compared to 1.8 mils in the Scitex 5000 printer and 1.3 mils in the Scitex 3600). As the orifice diameter decreases, jet straightness and wetting of the orifices in the peg area become vitally important. The slightest deposit or a non-uniform wetting on the orifice plate may cause excessive raggedness of the jets and results in poor print quality.

It is seen then that there is a need for an ink formulation capable of producing high quality acceptable print, which will run in a digital color press system.

SUMMARY OF THE INVENTION

This need is met by the primary color inks formulation according to the present invention, wherein the ink comprises a single dye component. Cyan, magenta, and yellow inks are formulated for successful runnability in the digital color press. In accordance with the present invention, improved jet straightness has been achieved by employing gold plated orifice plate surfaces in combination with the ink formulations.

In accordance with one aspect of the present invention, an ink jet ink composition comprises a liquid vehicle, a single dye component, a surfactant, and a glycol. In a preferred embodiment of the present invention, to optimize runnability and jet straightness, the ink formulated in accordance herewith is used with a digital color press employing a gold orifice plate having an orifice diameter in the range of 0.7 to 0.8 mil.

Other objects and advantages of the invention will be apparent from the following description and the appended claims.

DETAILED DESCRIPTION OF THE INVENTION

It is an object of the present invention to produce an ink with extremely good resolubility characteristics which are required to prevent clogging and jet directionality destabilizing deposits of very small orifices used in the digital color press system developed at Scitex Digital Printing, Inc., of Dayton, Ohio. Very little or no foam generation is desired to prevent carryover into the vacuum system. Finally, the inks formulated in accordance with the present invention provide good print quality and substrate penetration to aid in drying on coated papers.

Imaging in the digital color press is done with four separate and independent printheads. Each head images a different one of the primary colors, cyan, magenta, yellow or black. The printheads are of the binary, continuous ink jet type, and employ planar charging technology known in the art.

In a preferred embodiment of the present invention, imaging is done on a continuous web of paper. The various color heads are positioned behind each other so that they image sequentially on the paper as it passes underneath the head. In order to obtain high quality color images, multiple drops of each color ink are printed at each pixel location. The jet spacing is 240 dpi with an orifice diameter of 0.7 mil. The stimulation frequency is 100 kHz and all heads are synchronized. The web speed is typically 200 feet per minute accurately controlled.

The ink jet ink composition of the present invention comprises a liquid vehicle, a single dye component, a surfactant, and a glycol. The surfactant preferably comprises ethoxylated acetylenic diols, such as Surfynol 465, in amounts of 0.01% to 0.5% weight 90. The glycol is preferably ethylene glycol, in amounts of 1% to 10% weight 90.

The liquid vehicle in the ink jet ink composition of the present invention comprises a pH modifier such as an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as a triazole or alkanolamine; a wetting agent of from 0.01 to 0.5 wt. %, such as an ethoxylated acetylenic diols; glycol ether; and a biocide from 0 to 0.5 wt. % such as an isothiazolin or dehydroacetic acid. The ink may also include an optional defoamer such as phosphate esters, silicone or non-silicone defoamer or acetylenic diol.

The single dye component in the ink jet ink composition of the present invention is water soluble and preferably selected from the group consisting of Direct Dyes, Acid Dyes and Food Dyes, such as Direct Yellow 86, Acid Red 249, Acid Red 92, and Direct Blue 199. In general, the concentration of the dye should be between about 1% and 2% by weight.

Ingredients of two-dye inks which were formulated previously for use for 120 and 240 dpi systems were used in initial testing of the digital color press. However, these and other existing inks have always been comprised of multiple dye components, whereas the present invention relates to the formulation of primary color, i.e., single-dye component, inks. Such inks were formulated according to the Examples below, for use in a digital color press. These inks may be manufactured as follows:

PREPARATION OF INK

Example I

The following is one embodiment of an ink tested for use with the digital color press.

| Component | Weight % |
| --- | --- |
| single-dye component | 1.0 to 2.0 |
| amine | 0.2 to 1.5 |
| surfactant (TGE) | <1 |
| propylene glycol | 2 to 10 |
| Deionized water | Balance |

The single dye component comprises magenta, cyan or yellow dye. TGE and propylene glycol were used in the formulation of Example I because two-dye inks containing these components were used successfully in an existing Scitex printer having 240 dpi with a hole size of 1.3 mil. When the ink composition was formulated as above, the ink was used in a digital color press continuous ink jet printer having an electroplated nickel orifice plate with a hole size of approximately 1.2 mil, such as the type manufactured by Scitex Digital Printing, Inc., in Dayton, Ohio. The prints generated using the ink formulated in accordance herewith had severe raggedness problems and runnability problems. In an effort to correct these problems, the ink was diluted, with a dilutant such as water. Unfortunately, ink dilution did not improve raggedness or runnability.

Example II

A cyan ink formulated in accordance with Example II, was tested for use with the digital color press.

| Component | Weight % |
| --- | --- |
| Pro-Jet Cyan 1P (a single dye component) | 1.5 |
| DMAE | 0.40 |
| Surfynol 465 | 0.05 |
| TT-50 S | 0.10 |
| Proxel GXL | 0.20 |
| Ethylene Glycol | 5.00 |
| Deionized water | Balance |

Previously, only blue ink, a two-dye ink, had been formulated with Surfynol 465 and ethylene glycol. When the cyan ink composition was formulated as above, the ink was used in a digital color press continuous ink jet printer having an electroplated nickel orifice plate with a hole size of 1.2 mil, such as the type manufactured by Scitex Digital Printing, Inc., in Dayton, Ohio. The ink formulated in accordance herewith exhibited a viscosity of 1.10 cps and a surface tension of 42 dyne/cm. The prints generated using this ink had straighter jets, until the orifice hole size was reduced to 0.6 mil.

Since the cyan ink of Example II had superior runnability as compared to the magenta, cyan and yellow inks of Example I, Surfynol 465 and ethylene glycol were substituted for the TGE and propylene glycol, respectively, of Example I, to formulate ink in accordance with the present invention. The ink formulated in accordance with the present invention for use in a digital color press, may be manufactured as follows:

Example III

The following are various color inks having single-dye components, prepared in accordance with the present invention.

| Component | Weight % |
| --- | --- |
| Pro-Jet Magenta 1 (a single dye component) | 1.5 |
| DMAE | 0.40 |
| Surfynol 465 | 0.05 |
| TT-50 S | 0.10 |
| Proxel GXL | 0.20 |
| Ethylene Glycol | 5.00 |
| Deionized water | Balance |
| Viscosity = 1.1 cps | |
| Surface Tension = 40 dyne/cm | |
| Pro-Jet Yellow 1 (a single dye component) | 1.125 |
| DMAE | 0.40 |
| Surfynol 465 | 0.05 |
| TT-50 S | 0.10 |
| Proxel GXL | 0.20 |
| Ethylene Glycol | 5.00 |
| Deionized water | Balance |
| Viscosity = 1.1 cps | |
| Surface Tension = 42 dyne/cm | |

When the ink compositions were formulated as above in accordance with the present invention, the inks were used in a digital color press continuous ink jet printer having an electroplated nickel orifice plate with hole sizes of 0.6 to 0.7 mil, such as the type manufactured by Scitex Digital Printing, Inc., in Dayton, Ohio. The prints generated using the ink formulated in accordance herewith showed less raggedness. Furthermore, the inks had good runnability with acceptable jet straightness.

Example IV

In a further embodiment of the present invention, inks were prepared in accordance with Example III above, and used in conjunction with a digital color press having a gold orifice plate with an orifice diameter of 0.7 to 0.8 mil.

| Component | Weight % |
| --- | --- |
| single dye component | 1.50 |
| corrosion inhibitor | 0.10 |
| dispersant(s) | 0.25 |
| surfactant(s) | 0.10 |
| pH modifier | 1.00 |
| glycol ether(s) | 1.25 |
| water | Balance |

Gold Orifice Plate
Viscosity = 1.00 to 1.10 cps
Surface Tension = 29 to 32 cynes/cm The single dye component above is preferably Acid Red 249, for magenta ink. The glycol ethers are preferably selected from the group consisting of diethylene glycol n-butyl ether, n-butoxypropanol, propylene glycol methyl ether, and propylene glycol phenyl ether. The pH modifiers are preferably of the chemical family of alkyl alkanol amines. In a preferred embodiment, the surfactants are mixtures of acetylenic diols. The corrosion inhibitors are of the tolytriazole family.

Continuing with Example IV:

| Component | Weight % |
|---|---|
| AR-92 | 1.2 |
| DMAE | 0.9 |
| Surfynol 465 | 0.1 |
| TT-50 S | 0.1 |
| Proxel GXL | 0.1 |
| Ethylene Glycol | 1.6 |
| Acetic Acid | 0.2 |
| Deionized water | Balance |

Gold Orifice Plate
Viscosity is approximately 1.01 cps
Surface Tension is approximately 43 dynes/cm

| | |
|---|---|
| Pro-Jet Yellow 1 | 1.125 |
| DMAE | 0.40 |
| Surfynol 465 | 0.05 |
| TT-50 S | 0.10 |
| Proxel GXL | 0.20 |
| Ethylene Glycol | 5.00 |
| Deionized water | Balance |

Gold Orifice Plate
Viscosity is approximately 1.1 cps
Surface Tension is approximately 42 dynes/cm Electroplated nickel, ordinarily used to make orifice plates, has unstable wetting characteristics. Simple immersion of the Ni orifice plate in ink or other fluids shows uneven wetting, which can have the undesirable result of ragged jets. In contrast, gold plated surfaces show even wetting over long periods. In addition, local meniscus residues, which occasionally shows on Ni electroplated surfaces, did not show in gold plated surfaces.

When the ink formulated according to Example IV above was used in a digital color press system having a gold orifice plate, the prints generated exhibited superior print quality and the printheads demonstrated excellent runnability.

As will be obvious to anyone skilled in the art, the ingredients in all of the examples above are commercially available. It is also understood and known in the art that runnability is dye specific, resulting in variations in the amount of runnability achieved. The ink composition of the present invention is particularly adaptable for incorporation into a digital color press ink jet printing apparatus for forming images by causing the ink to be expelled in droplets onto a substrate, thereby generating an image on the substrate.

The present invention has resulted in ink having improved physical properties, such as higher surface tension and lower viscosity. The improved digital color press imaging technique of the present invention is provided by novel ink formulations used in conjunction with an orifice plate having a gold plated surface, rather than the typically used electroplated nickel orifice plate, which tends to have unstable wetting characteristics.

INDUSTRIAL APPLICABILITY AND ADVANTAGES

The present invention is useful in the field of ink jet printing, and has the advantage of formulating a modified dye for use in ink jet printing ink which has decreased solubility and increased waterfastness.

The invention has been described in detail with particular reference to certain preferred embodiments thereof, but it will be understood that modifications and variations can be effected within the spirit and scope of the invention.

We claim:

1. A primary color ink jet ink composition for use with a digital color press, the primary color ink jet ink composition comprising a liquid vehicle, a single dye component, the dye component being water soluble and selected from the group consisting of Direct Yellow 86, Acid Red 249, Acid Red 92 and Direct Blue 199, an ethoxylated acetylenic diol surfactant and ethylene glycol.

2. An ink jet ink composition as claimed in claim 1 wherein the dye is water soluble and selected from the group consisting of Direct Dyes, Acid Dyes and Food Dyes.

3. An ink jet ink composition as claimed in claim 1 wherein concentration of the dye is in the range of 1% to 2% by weight.

4. An ink jet composition as claimed in claim 1 wherein the liquid vehicle is selected from the group consisting of a wetting agent, a biocide, deionized water, and mixtures thereof.

5. An ink jet composition as claimed in claim 4 wherein the liquid vehicle is selected from the group consisting of a wetting agent, a biocide, deionized water, a corrosion inhibitor, and mixtures thereof.

6. An ink jet composition as claimed in claim 1 further comprising a pH modifier.

7. A process for generating images which comprises incorporating into an ink jet printing apparatus the ink composition of claim 1 and forming images by causing the ink to be expelled in droplets onto a substrate, thereby generating an image on the substrate.

8. A process as claimed in claim 7 wherein the image is generated by a continuous stream ink jet printing process.

9. A process as claimed in claim 8 wherein the image is generated by a continuous stream ink jet printing process having a gold orifice plate.

10. A process as claimed in claim 9 wherein the gold orifice plate has an orifice diameter in the range of 0.7 to 0.8 mil.

* * * * *